(12) United States Patent
Gan et al.

(10) Patent No.: US 11,228,377 B2
(45) Date of Patent: Jan. 18, 2022

(54) METHOD AND APPARATUS FOR FORMING A NETWORK

(71) Applicant: MOTOROLA SOLUTIONS, INC, Chicago, IL (US)

(72) Inventors: Guo Dong Gan, Kuala Lumpur (MY); Wai Mun Lee, Ipoh (MY); Bing Qin Lim, Jelutong (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 340 days.

(21) Appl. No.: 16/314,881

(22) PCT Filed: Aug. 25, 2016

(86) PCT No.: PCT/MY2016/000052
§ 371 (c)(1),
(2) Date: Jan. 3, 2019

(87) PCT Pub. No.: WO2018/038594
PCT Pub. Date: Mar. 1, 2018

(65) Prior Publication Data
US 2019/0245629 A1    Aug. 8, 2019

(51) Int. Cl.
*H04B 11/00*      (2006.01)
*G06F 1/16*       (2006.01)
*H04L 29/08*      (2006.01)
*H04W 4/80*       (2018.01)
*H04W 12/55*      (2021.01)

(52) U.S. Cl.
CPC ............. *H04B 11/00* (2013.01); *G06F 1/163* (2013.01); *H04L 67/12* (2013.01); *H04W 4/80* (2018.02); *H04W 12/55* (2021.01)

(58) Field of Classification Search
None
See application file for complete search history.

(56) References Cited

U.S. PATENT DOCUMENTS

| 7,796,945 B2 | 9/2010 | Abbate et al. |
| 2006/0195695 A1 | 8/2006 | Keys |

(Continued)

OTHER PUBLICATIONS

Takuro Yonezawa et al.: "Vib-Connect: A Device Collaboration Interface Using Vibration", Embedded and Real-Time Computing Systems and Applications (RTCSA), 2011 IEEE 17th International Conference On, IEEE, Aug. 28, 2011, pp. 121-125.

(Continued)

*Primary Examiner* — Adolf Dsouza

(57) ABSTRACT

A method and apparatus for quickly forming a PAN is describe herein. During operation, a modulated vibration will be received that identifies that network formation is to take place. All devices detecting the vibration will be paired/associated to form a PAN. In one embodiment of the present invention a first device generates the vibration and the subset of available devices will form a PAN with the first device acting as a master device within the formed PAN. In another embodiment of the present invention, a piece of clothing (e.g., a vest) is equipped with a haptic module (vibrating circuitry) to generate the vibration. All pieces of equipment attached to the piece of clothing will receive the vibration and pair accordingly.

7 Claims, 5 Drawing Sheets

(56) References Cited

U.S. PATENT DOCUMENTS

2010/0167646 A1* 7/2010 Alameh ............... H04W 12/06
　　　　　　　　　　　　　　　　　　　　　　455/41.2
2015/0145671 A1* 5/2015 Cohen ............... G08B 13/2445
　　　　　　　　　　　　　　　　　　　　　　340/539.11

OTHER PUBLICATIONS

Inhwan Hwang et al.: "Prvacy=Aware communication for Smartphones Using Vibration", Embedded and Real-Time Computing Systems and Applications (RTCSA), 2012 IEEE 18th International Conference On, IEEE Aug. 1, 2012, pp. 447-452.
The International Search Report and the Written Opinion corresponding serial No. PCT/MY2016/000052 filed Aug. 25, 2016, all pages.

* cited by examiner

METHOD AND APPARATUS FOR FORMING A NETWORK

FIELD OF THE INVENTION

The present invention generally relates to forming a network, and more particularly to a method and apparatus for forming a network based upon a generated vibration.

BACKGROUND OF THE INVENTION

Next-generation public safety officers will be equipped with devices that determine various physical and environmental conditions surrounding the public-safety officer. These conditions are generally reported back to a dispatch operator at a dispatch center so an appropriate action may be taken. For example, future police officers may have a sensor that determines when a gun is drawn. Upon detecting that an officer has drawn their gun, a notification may be sent back to the dispatch operator so that, for example, other officers in the area may be notified of the situation.

It is envisioned that the public-safety officer of the future will have an array of shelved devices available to the officer at the beginning of a shift or at the assignment of a particular task. The officer will select the devices off the shelf, and form a personal area network (PAN) with the devices that will accompany the officer on their shift or task. For example, upon the assignment of a particular task, the officer may pull a gun-draw sensor, a body-worn camera, a wireless microphone, a smart watch, a police radio, a man-down sensor, . . . , etc. All devices pulled by the officer will be configured to form a PAN by associating (pairing) with each other and communicating wirelessly among the devices.

A method called bonding is typically used for recognizing specific devices and thus enabling control over which devices are allowed to connect to each other when forming the PAN. Once bonded, devices then can establish a connection without user intervention. A bond is created through a process called "pairing". The pairing process is typically triggered by a specific request by the user to create a bond from a user via a user interface on the device.

Thus, pairing and unpairing devices to form or tear down a PAN typically involves some level of user interaction. This user interaction is the basis for confirming the identity of devices. Once pairing successfully completes, a bond will have been formed between the two devices, enabling those two devices to connect to each other in the future without again requiring the pairing process. When desired, the bonding relationship can later be removed by the user.

Because devices are pulled randomly at the beginning of a shift/task, an officer may pull a different array of devices every time they form a PAN. This requires that old bonds be cleared from every device at the end of a shift/task, and new bonds to be formed every time the officer pulls devices at the beginning of their shift/task.

A problem with the above-described scenario is that forming a PAN at the beginning of a shift/task from the pulled devices, as well as tearing down the PAN at the end of the shift/task from the pulled devices can take a considerable amount time for the officer. For example, a public-safety officer will need to access each device and "associate/pair" the device to the PAN at the beginning of their shift/task. In a similar manner, the public-safety officer will need to access each device and "disassociate/unpair" the device from the PAN at the end of their shift/task. This will take a considerable amount of time and effort. Considering this fact, there is a need for a method and apparatus for quickly forming a PAN that requires little user interaction to do so.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
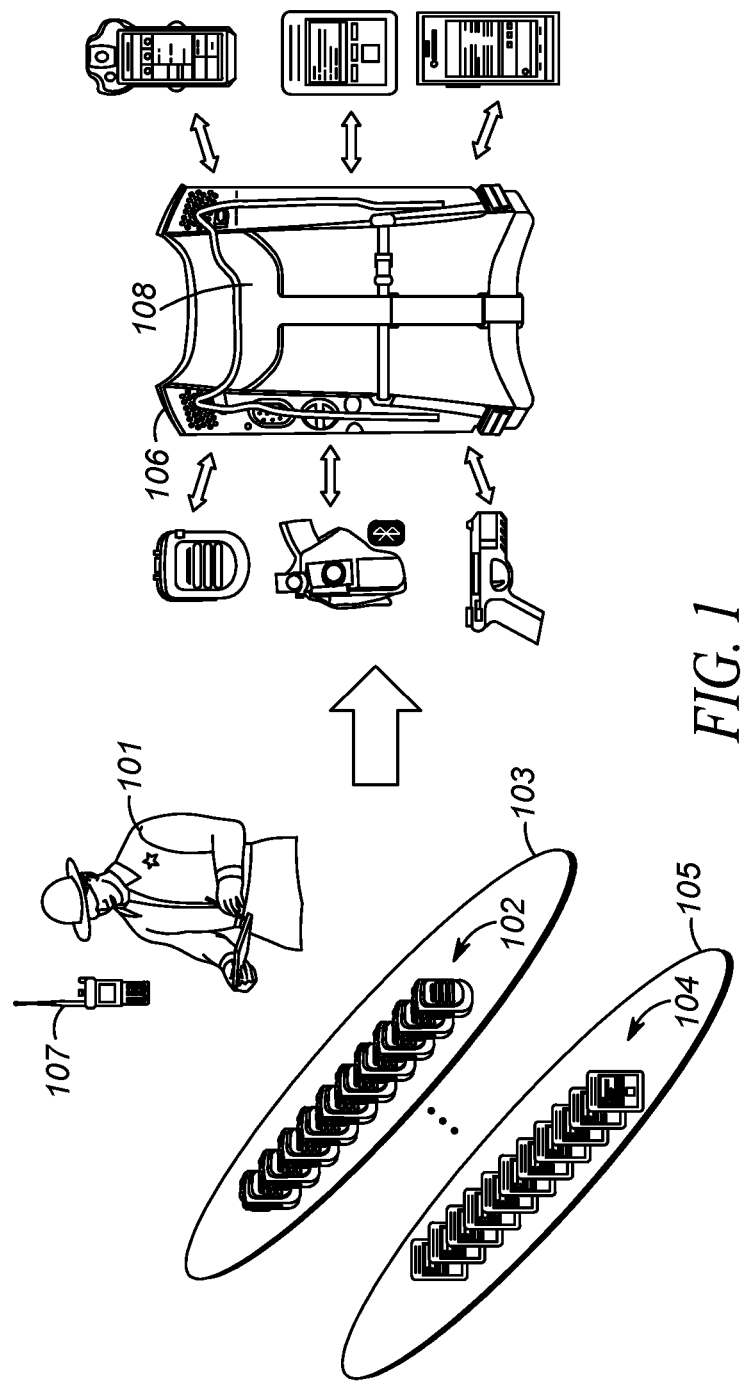
FIG. 1 illustrates an operational environment for the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for quickly forming a PAN is describe herein. During operation, a vibration will be received that identifies that network formation is to take place. All devices detecting the vibration will be paired/associated to form a PAN. In one embodiment of the present invention a first device generates the vibration (with or without modulation) and the subset of available devices will form a PAN with the first device acting as a master device within the formed PAN. In another embodiment of the present invention, a piece of clothing (e.g., a vest) is equipped with a haptic module (vibrating circuitry) to generate the vibration. All pieces of equipment attached to the piece of clothing will receive the vibration and pair accordingly.

Since devices uniquely needed by an officer are automatically associated with each other to form a PAN upon the detection of the vibration, the time consumed during the formation of a PAN is greatly reduced. In addition, user involvement in the formation of the PAN is minimized. Additionally, vibration-enabled pairing is superior to any form of pairing initiated by RF signals since the RF signal can be detected by adjacent unauthorized receivers and pairing may take place with unwanted devices.

In a preferred embodiment of the present invention the vibration is a signal of constant, predetermined and modulated pattern of frequency and amplitude (i.e., it's frequency and amplitude may change in a predetermined pattern). In another embodiment of the present invention, the vibration is un-modulated. When modulated, only reception of the predetermined modulated vibration will cause pairing to take place. When un-modulated, only reception of the predetermined un-modulated vibration (e.g., vibration at a predetermined constant frequency) will cause pairing to take place.

It should be noted that the terms associate, associating, pair, pairing, form, and forming can be used interchangeably, and simply mean that a device is added to an existing PAN, or a PAN is created with the device as a member. The PAN described above that is formed between devices preferably comprises a wireless PAN that comprises a low-powered PAN carried over a short-distance wireless network technology such as PANs formed using the following standards: INSTEON, IrDA, Wireless USB, Bluetooth, Z-Wave, ZigBee, and Body Area Network. The reach of a wireless PAN varies from a few centimeters to a few meters. Associating/pairing and disassociating/unpairing a device from the PAN is well known in the art, and takes place as instructed by any of the above standards.

It should also be noted that the present invention forms a PAN with at least some devices that are not in service at the time of the incident. These devices are not associated with any network, talkgroup, . . . , etc. Once the predetermined vibration is detected, the devices form a PAN that is generally under the control of one user, and is very local in nature (e.g., within 10 feet). The PAN is formed by automatically associating and pairing those devices that receive the particular vibration. The devices will store the predetermined vibration patterns in its memory or storage. For example, when an officer accepts a task/mission, a device currently associated with the officer (e.g., their police radio) may generate a vibration that causes all devices that receive the vibration to associate with the radio to form a PAN.

As an example of the above, assume an officer is assigned a task to issue parking tickets, the devices necessary for the tasks may be radio, a hand-held tablet, a camera, and a portable printer. The necessary devices will be attached to a vest, with one device being instructed to generate a predetermined vibration after all devices have been attached to the vest.

As one of ordinary skill in the art will recognize, during the formation of a Bluetooth PAN there is typically one master device (hub) and one or more slave devices. The number of slave devices is limited by the capability of the master device. All communication within a PAN is between the master and slave devices. There is no direct communication between the slave devices over a PAN, although these devices may have separate Bluetooth connections between them that do not use the PAN.

After a PAN is established, the slave devices are synchronized to the timing and frequencies specified by the master device (sometimes referred to as a hub). Note that in a PAN, each slave device uses a different physical channel. Thus, a PAN starts with two connected devices, and may grow to any number of connected devices (although in some systems eight is the maximum number of devices within a Bluetooth PAN). Bluetooth communication always designates one of the Bluetooth devices as a main controlling unit or master unit. Other devices that follow the master unit are slave units. This allows the Bluetooth system to be non-contention based (no collisions). This means that after a Bluetooth device has been added to the PAN, each device is assigned a specific time period to transmit and they do not collide or overlap with other units operating within the same PAN.

As a further example of the above, assume that each officer on a police force is assigned their own radio for communications on a semi-permanent basis. Each radio may also generate a vibration (which may or may not be unique to each radio). At the beginning of a shift, an officer need only attach all devices to a vest and instruct their radio to generate the vibration in order to automatically create a PAN with devices that receive the vibration. For example, assume Officer Smith is assigned a radio that generates a vibration (e.g., a 10 Khz vibration that pulses on and off every second). The generation of the vibration may pair all devices that "feel" the vibration.

FIG. 1 depicts a general operating environment for the above-described technique for forming a PAN. As shown, public-safety officer 101 has an array of devices 102 and 104 to use during the officer's shift or after being assigned a particular task. For example, the officer may be permanently assigned one radio 107 The officer may need one camera 104 and one wireless microphone 102 for use during their shift or during a particular task. Other devices (not shown) may be assigned as well. As shown, devices 102 and 104 may be located on a charging port 103/105.

As shown in FIG. 1, officer 101 will preferably wear the devices during a shift or incident by attaching the devices to worn clothing, for example, a vest. These devices will form a PAN throughout the officer's shift or assigned task. When the devices are attached to the officer's clothing, at least one device will be instructed to generate a pairing vibration. The pairing vibration will be received by all devices attached to the clothing by traveling through the officer's body, or by traveling through the officers clothing, or by a conduit 108 inserted in the clothing. It should be noted that vibration conduits 108 may be run through the clothing between points of device contact. For example, a small plastic or metallic strip may be sewn into, or onto the clothing, and connect all points of device contact to each other. When a device connected to the clothing generates a vibration, the plastic or metallic strip 108 may act as a conduit for the vibration, so that all other devices may receive the vibration. It should be noted that if the piece of clothing fits tight enough, the human body may act as the conduit.

Figure 2:
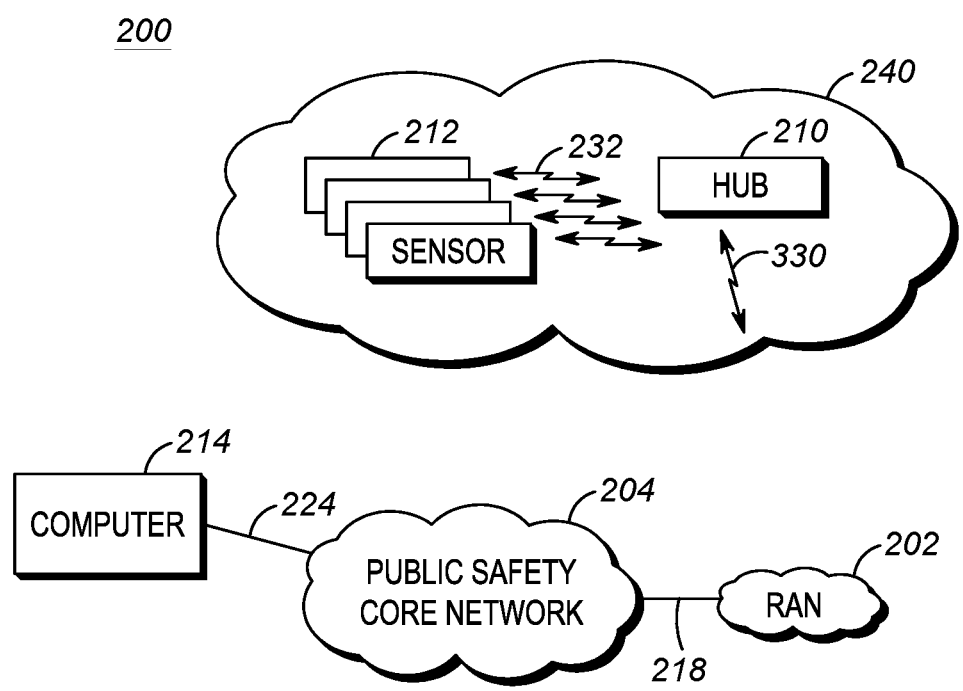
FIG. 2 depicts an example communication system.

FIG. 2 depicts an example communication system 200 that incorporates PANs created as described above. System 200 includes one or more radio access networks (RANs) 202, a public-safety core network 204, hub (PAN master device) 210, local devices (slave devices) 212, a computer 214, and communication links 218, 224, and 232. In a preferred embodiment of the present invention, hub 210 and devices 212 form a PAN 240, with communication links 232 between devices 212 and hub 210 taking place utilizing a short-range communication system protocol such as a Bluetooth communication system protocol.

Each RAN 202 includes typical RAN elements such as base stations, base station controllers (BSCs), routers, switches, and the like, arranged, connected, and programmed to provide wireless service to user equipment (e.g., hub 210, and the like) in a manner known to those of skill in the relevant art.

The public-safety core network 204 may include one or more packet-switched networks and/or one or more circuit-switched networks, and in general provides one or more public-safety agencies with any necessary computing and communication needs, transmitting any necessary public-safety-related data and communications.

The hub 210 may be any suitable computing and communication devices configured to engage in wireless communication with the RANs 202 over the air interface as is known to those in the relevant art. Moreover, one or more hub 210 are further configured to engage in wired and/or wireless communication with one or more local device 212 via the communication link 232. Hub 210 will be configured to determine when to forward information via RANs 202 based on a combination of device 212 inputs.

Devices 212 and hub 210 may comprise any device capable of forming a PAN. For example, devices 212 may comprise a gun-draw sensor, a camera, a GPS receiver capable of determining a location of the user device, a clock, calendar, environmental sensors (e.g. a thermometer capable of determining an ambient temperature, humidity, presence of dispersed chemicals, radiation detector, etc.), an accelerometer, a barometer, speech recognition circuitry, a gunshot detector, . . . , etc.

Any one or more of the communication links 218, 224, could include one or more wireless-communication links and/or one or more wired-communication links.

Finally, computer 214 is part of a computer-aided-dispatch center, manned by an operator providing necessary dispatch operations. For example, computer 214 typically comprises a graphical user interface that provides the dispatch operator necessary information about public-safety officers. As discussed above, much of this information originates from devices 212 providing information to hub 210, which forwards the information to RAN 202 and ultimately to computer 214.

Figure 3:
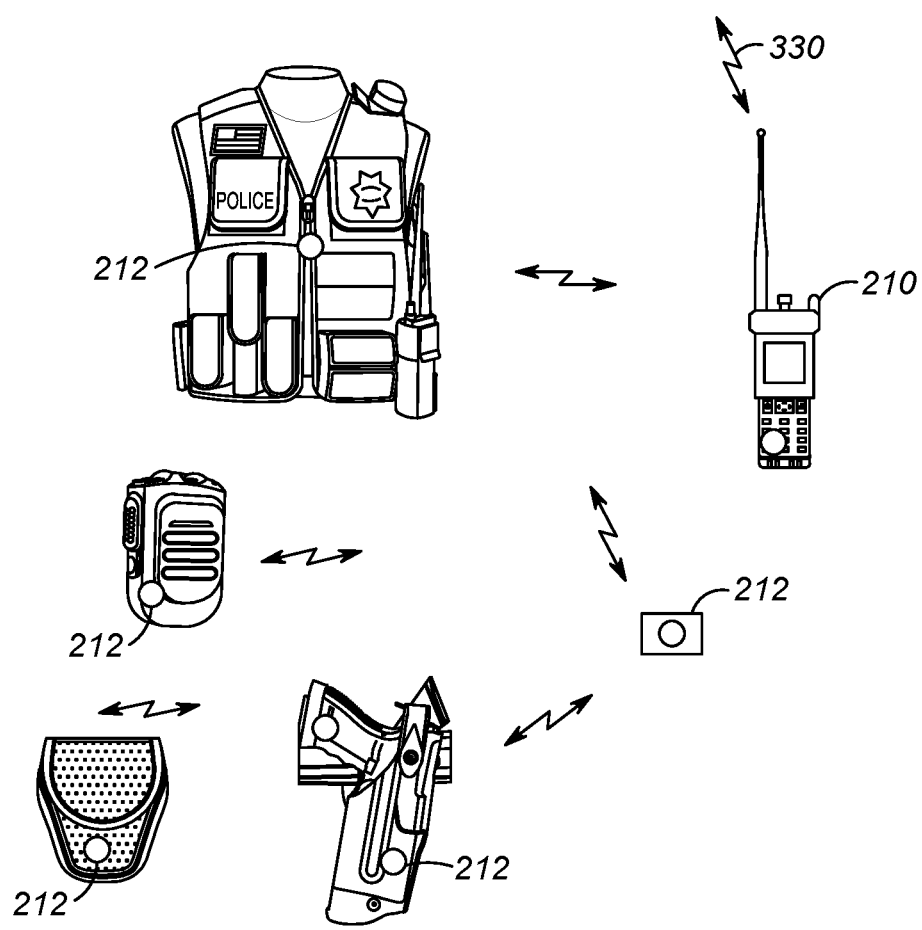
FIG. 3 depicts a more-detailed view of the personal-area network of FIG. 1.

FIG. 3 depicts a more-detailed view of the personal-area network of FIG. 2. Personal-area network comprises a very local-area network that has a range of, for example 10 feet. As shown in FIG. 3, various devices 212 are shown attached to equipment utilized by a public-safety officer. In this particular example, a bio-sensor is located within a police vest, a voice detector is located within a police microphone, a handcuff deployment sensor is located with a handcuff pouch, a gun-draw sensor is located within a holster, and a camera 212 is provided. In FIG. 3, all sensors (except for camera 212) are represented by circles attached to an item to be monitored.

Devices 212 and hub 210 form a PAN 240. PAN 240 preferably comprises a Bluetooth PAN. Devices 212 and hub 210 are considered Bluetooth devices in that they operate using a Bluetooth, a short range wireless communications technology at the 2.4 GHz band, commercially available from the "Bluetooth special interest group". Devices 212 and hub 210 are connected via Bluetooth technology in an ad hoc fashion forming a PAN. Hub 210 serves as a master device while devices 212 serve as slave devices. Devices 212 notify hub 210 of a sensed condition by sending a local status alert transmitted from the sensor as a Bluetooth message. Hub 210 in turn, may forward the local status alert over a wide-area network (e.g., RAN/Core Network) to computer 214. In alternate embodiments of the present invention, hub 210 may forward the local status alert to mobile and non-mobile peers (shift supervisor, peers in the field, etc), or to the public via social media.

Figure 4:
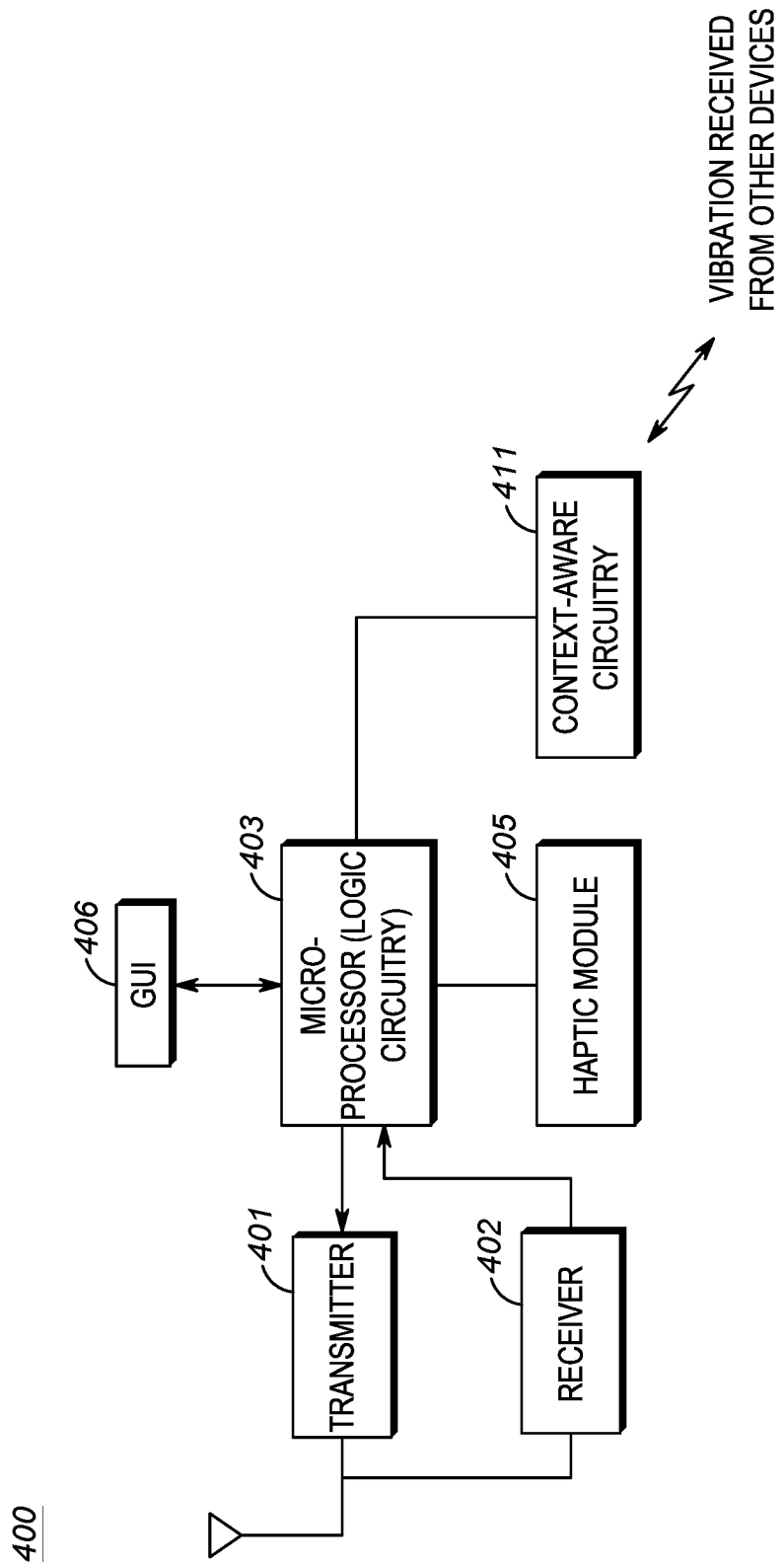
FIG. 4 is a block diagram of a device of FIG. 1.

FIG. 4 is a block diagram of a device 400 (e.g., radio 107) of FIG. 1. As shown, device 400 may include transmitter 401, receiver 402, haptic module (vibrating circuitry) 405, graphical-user interface (GUI) 406, logic circuitry (microprocessor) 403, and context-aware circuitry 411. In other implementations, device 400 may include more, fewer, or different components.

Transmitter 401 and receiver 402 may be well known long-range and/or short-range transmitters and receivers that utilize any number of network system protocols. For example, transmitter 401 and receiver 402 may be configured to utilize Bluetooth communication system protocol for a body-area network, a private 802.11 network, a next-generation cellular communications protocol operated by a cellular service provider, or any public-safety protocol such as an APCO 25 network or the FirstNet broadband network. Although only a single transmitter and receiver is shown in FIG. 4, one of ordinary skill in the art will recognize that multiple transmitters and receivers may exist in device 4 400 to provide simultaneous communications using any number of communication system protocols. Transmitter 401 and receiver 402 thus comprises common circuitry known in the art for communication utilizing a well known communication protocol, and serve as means for transmitting and receiving necessary information from other devices to form a PAN.

Context-aware circuitry 411 may comprise any device capable of receiving a haptic vibration. For example, context-aware circuitry 411 may comprise an accelerometer capable of determining a frequency, duration, and/or amplitude of a received vibration.

Haptic module 405 provides various haptic effects (such as vibration) that can be received by other devices. When the haptic module 405 generates a vibration as, the intensity and the pattern of vibration generated by the haptic module 405 may be altered in various predetermined manners. The predetermined manner of vibration may convey different "meanings" to devices who receive the vibrations. At least one predetermined pattern of vibration will cause a device to pair with all other devices receiving the predetermined pattern of vibration.

Logic circuitry 403 comprises a digital signal processor (DSP), general purpose microprocessor, a programmable logic device, or application specific integrated circuit (ASIC) and is utilized to form a PAN upon the detection of a predetermined vibration from circuitry 411, or alternatively to receive a command from GUI 406 to form a PAN, and instruct haptic module 405 to generate the appropriate vibration.

GUI 205 receives an input from a user to initiate PAN formation. In addition, in an embodiment, GUI 205 provides a way of conveying (e.g., displaying) PAN information to the user. In particular, in an embodiment, a user may press a predetermined button, or scroll through and select a predetermined menu item to form a PAN. In order to provide the above features (and additional features), GUI 205 may include a display, a keyboard, a mouse, and/or various other hardware components to provide a man/machine interface.

The device shown in FIG. 4 can function as a device that receives an instruction via GUI 205 to form a network, or functions as a device (apparatus) that receives a vibration through context-aware circuitry 411, and forms a PAN with other devices receiving the vibration.

Thus, the device shown in FIG. 4 may comprise a device that comprises context-aware circuitry receiving a vibration and logic circuitry determining if the vibration comprises a predetermined pattern of vibration and forming a personal-area network (PAN) with devices based on the vibration comprising the predetermined pattern of vibration.

The vibration may comprise an oscillation, tremor, shaking, quivering, or pulsation received through a piece of clothing. The predetermined pattern may comprise a predetermined frequency or amplitude of vibration. The PAN is preferably formed only with other devices that detected the vibration.

The device shown in FIG. 4 may also form a PAN when instructed to do so. This device may comprise a graphical user interface (GUI) receiving an instruction to form a personal-area network (PAN), vibrating circuitry generating a vibration of a predetermined pattern based on the received instruction, and logic circuitry forming a personal-area network (PAN) with devices that received the predetermined pattern of vibration.

Figure 5:
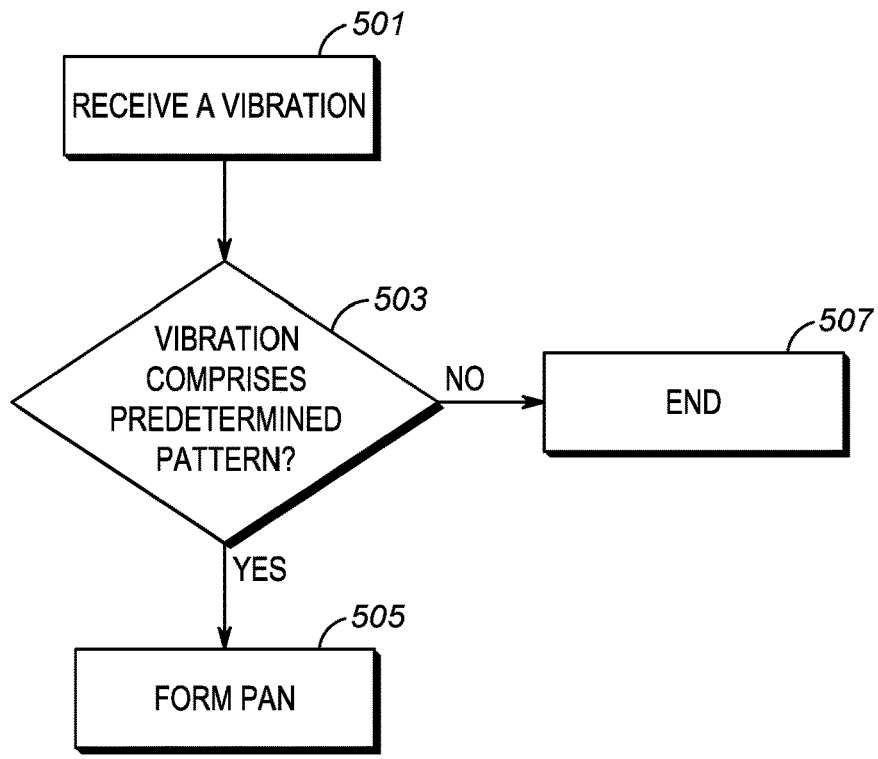
FIG. 5 is a flow chart showing operation of the device of FIG. 4.

FIG. 5 is a flow chart showing operation of the device of FIG. 4. More particularly, the logic flow of FIG. 5 shows those steps (not all necessary) for receiving a vibration and pairing accordingly. The logic flow begins at step 501 where context-aware circuitry 411 receives a vibration. The vibration preferably comprises an oscillation, tremor, shaking, quivering, or pulsation through a piece of clothing, where the predetermined pattern comprises a predetermined frequency or amplitude of vibration.

At step 503 parameters of the vibration (e.g., pattern, frequency, amplitude, . . . , etc) are passed to logic circuitry 403 and logic circuitry 403 determines if the vibration comprises a predetermined pattern of vibration. The predetermined pattern may be stored in a memory (not shown in FIG. 4), and compared to the pattern received from circuitry 411. If, at step 503 the vibration comprises the predetermined pattern, a personal-area network (PAN) is formed with devices based on the vibration comprising the predetermined pattern of vibration (step 505). This is accomplished by every device receiving the predetermined pattern to enter a discovery mode, and form a PAN accordingly. Standard messaging (e.g., standard Bluetooth messaging transmitted and received via transmitter 401 and receiver 402) may take place to facilitate the PAN formation. If the vibration doesn't match the predetermined pattern, the logic flow ends at step 507.

Figure 6:
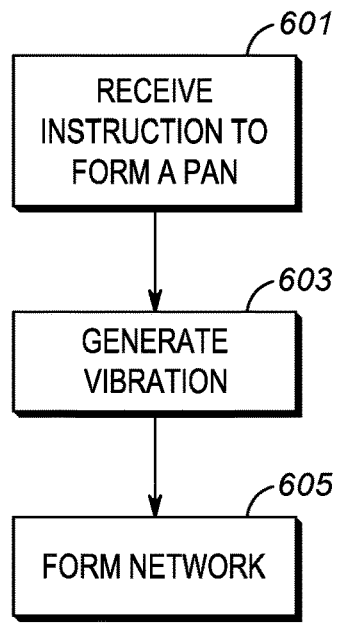
FIG. 6 is a flow chart showing operation of the device of FIG. 4

FIG. 6 is a flow chart showing operation of the device of FIG. 4. The logic flow of FIG. 6 shows those steps (not all necessary) to form a PAN when a device is instructed to do so. The logic flow begins at step 601 where GUI 406 receives an instruction from a user interface to form a personal-area network (PAN). At step 603, GUI 406 passes the instruction to logic circuitry 403, and logic circuitry 403 instructs haptic module 405 to generate a vibration of a predetermined pattern based on the received instruction. As discussed above the step of generating the vibration may comprise the step of generating an oscillation, tremor, shaking, quivering, or pulsation of a piece of clothing, with the predetermined pattern comprising a predetermined frequency or amplitude of vibration. Finally, at step 605 a PAN is formed with devices that received the predetermined pattern of vibration. As discussed above, logic circuitry 403 may form the PAN as a master device.

Forwarding Haptic Signal

In yet another embodiment of the present invention the haptic signal may be forwarded (propagated) by a device, or devices, that receive the haptic signal via an over-the-air communication. For example, assume that along with a vest, a user wishes to wear a smart utility belt capable of having devices hung off of it. In this scenario, the utility belt may be equipped with the components shown in FIG. 4. Receiver 402 will receive an over-the-air communication (e.g., via a Bluetooth link with the vest or another device). The Bluetooth link will provide data regarding the haptic signal (vibration) that is to be forwarded to any device hanging or attached to the belt. The data may comprise a frequency, amplitude, and/or modulation pattern needed to initiate pairing as described above.

So for example, a vest may be worn. The vest may be equipped with the components shown in FIG. 4, or may alternatively have a device attached to it that is equipped with the components shown in FIG. 4. All devices attached to the vest may receive the haptic signal and pair as described above. However, in this particular embodiment, another device (e.g., a utility belt) may also be worn by the user. The utility belt may not be coupled to the vest. In order to pair equipment on the utility belt with equipment on the vest, the vest (or a device on the vest) will transmit data regarding the haptic signal needed for pairing). Once this data has been received (e.g., via a Bluetooth link), the haptic signal is generated by the belt (or a device on the belt) so that all other devices on the belt may be paired with the devices on the vest as described above. As with the vest, the belt may have a conduit for propagating the vibration to other devices on the belt.

With the above in mind, the device shown in FIG. 4 may comprise 15. An apparatus comprising an over-the-air receiver 402 receiving an instruction to form a personal-area network (PAN). The instructions may comprise data regarding the vibration pattern. Vibrating circuitry 405 will generate a vibration of a predetermined pattern based on the received instruction. Logic circuitry will then a personal-area network (PAN) with devices that received the predetermined pattern of vibration.

In the foregoing specification, specific embodiments have been described. However, one of ordinary skill in the art appreciates that various modifications and changes can be made without departing from the scope of the invention as set forth in the claims below. For example, while the above technique was described with reference to forming/associating with a PAN, one of ordinary skill will recognize that a PAN, or association with any network may be achieved as described above. For example, association with a LAN may be performed as described above. Additionally, the above description was described with a single receiver receiving a vibration and then instructing devices to form a PAN. One or ordinary skill in the art will recognize that each device themselves may receive the vibration, and form a network accordingly. Additionally, the PANs formed above are based on a vibration of a signal received; however, other information may be used to determine PAN members. For example, the vibration may be modulated in any number of ways (e.g., amplitude/frequency). Accordingly, the specification and figures are to be regarded in an illustrative rather than a restrictive sense, and all such modifications are intended to be included within the scope of present teachings.

The above technique can be achieved by receiving over-the-air data that includes information on a vibration needed to pair devices to form a personal-area network (PAN). The vibration may then be generated having a predetermined pattern based on the received over-the-air data. A PAN may then be formed with devices that received the vibration.

As discussed above, the step of generating the vibration may comprise the step of generating an oscillation, tremor, shaking, quivering, or pulsation of a piece of clothing, and the predetermined pattern may comprise a predetermined frequency or amplitude of vibration.

An apparatus may be provided comprising an over-the-air receiver receiving data on a vibration needed to form a personal-area network (PAN), vibrating circuitry generating the vibration having a predetermined pattern based on the received data; and logic circuitry forming a personal-area network (PAN) with devices that received the predetermined pattern of vibration.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for forming a network, the method comprising the steps of:
   receiving, at a device including a receiver, over-the-air data that includes information on a vibration needed to pair devices to form a personal-area network (PAN);
   generating, with a haptic module of the device, the vibration having a predetermined pattern based on the received over-the-air data, the step of generating comprising generating an oscillation, tremor, shaking, quivering, or pulsation of a piece of clothing, the piece of clothing including a conduit inserted in the piece of clothing to transmit the vibration to devices attached to the piece of clothing; and
   forming a personal-area network (PAN) with devices that received the vibration and the device.

2. The method of claim 1 wherein the predetermined pattern comprises a predetermined frequency or amplitude of vibration.

3. The method of claim 2 wherein the step of forming the PAN comprises the step of forming the PAN only with other devices that detected the vibration.

4. The method of claim 3 wherein the step of forming the PAN comprises the step of forming the PAN as a master device only with other devices that detected the vibration.

5. An apparatus comprising:
   an over-the-air receiver receiving data on a vibration needed to form a personal-area network (PAN);
   vibrating circuitry, comprising a haptic module, generating the vibration having a predetermined pattern based on the received data, the vibration comprising an oscillation, tremor, shaking, quivering, or pulsation of a piece of clothing, the piece of clothing including a conduit inserted in the piece of clothing to transmit the vibration to devices attached to the piece of clothing; and logic circuitry forming a personal-area network (PAN) with devices that received the predetermined pattern of vibration and the apparatus.

6. The apparatus of claim 5 wherein the instruction comprises data regarding the vibration.

7. The apparatus of claim 5 wherein PAN is formed as a master device only with other devices that detected the vibration.

\* \* \* \* \*